Nov. 25, 1952

J. D. RALSTON 2,619,116

VALVE

Filed Nov. 19, 1948

Inventor
JOHN D. RALSTON
By Lauphere and
Van Valkenburgh
Attorneys

Nov. 25, 1952  J. D. RALSTON  2,619,116
VALVE

Filed Nov. 19, 1948  4 Sheets-Sheet 2

Inventor
JOHN D. RALSTON
By Lamphere and
Van Valkenburgh
Attorneys

Nov. 25, 1952  J. D. RALSTON  2,619,116
VALVE

Filed Nov. 19, 1948  4 Sheets-Sheet 3

Inventor
JOHN D. RALSTON
By Lamphere and
Van Valkenburgh
Attorneys

Nov. 25, 1952 J. D. RALSTON 2,619,116
VALVE
Filed Nov. 19, 1948 4 Sheets-Sheet 4

Inventor
JOHN D. RALSTON
By Lamphere and
Van Valkenburgh
Attorneys

Patented Nov. 25, 1952

2,619,116

UNITED STATES PATENT OFFICE 2,619,116

VALVE

John D. Ralston, Indianapolis, Ind.

Application November 19, 1948, Serial No. 60,925

9 Claims. (Cl. 137—561)

This invention relates to valves, and more particularly to filling valves and the like, for controlling the flow of liquids with precision.

With valves used in filling containers, such as bottles or ampoules to be filled with relatively exact amounts of pharmaceutical liquids, it is desirable to be able to begin and also discontinue the flow of liquid precisely, so that the bottle or ampoule will contain no more and no less than a predetermined measured amount of liquid. A measured amount of liquid could be obtained by an accurately timed period of flow, since timing can be made very accurate, as by electrical control, but one defect in prior valves lies in the inertia or lag in the start of flow, which may vary from time to time, and therefore is not determinable with exactitude. Another defect in prior valves is the difficulty in terminating the flow exactly, since some of the liquid tends to be discharged after the flow should have stopped. The container may therefore be inaccurately filled, or the liquid may spill onto or over the next container or onto the filling apparatus. Sometimes the valve, or each of a series of valves, is set so that the liquid remaining in the valve outlet is expected to flow into the container, but a greater or lesser proportion of the liquid often remains in the valve outlet, so that the amount placed in the container is inaccurate. Also, if the filling device is adjusted so that the container remains in filling position until all liquid possible has drained from the valve outlet, then the filling operation is lengthened unduly. As will be evident, speed in the filling operation is desirable, particularly when large numbers of containers, such as bottles or ampoules, are being filled, since the number of containers to be filled may run into the thousands.

Furthermore, additional discharge or dripping after flow should have been stopped tends to cause the outside of the needle or filling tube to be wet, and when the container has a small restricted neck, as in the case of ampoules or the like, the result is that liquid may remain in the neck, since the filling needle or tube normally has an outside diameter only slightly less than the inside diameter of the neck. This is particularly undesirable, since small neck ampoules are usually sealed by flame heating the neck and fusing the same while removing the portion above the neck by drawing or cutting off by melting. Any medicinal liquid remaining in the neck tends to char upon such flame heating, thus tending to contaminate the contents of the ampoule.

Among the objects of the present invention are to provide a novel valve, particularly adapted to be utilized in filling operations and the like; to provide such a valve which will permit the flow of liquid to start immediately upon opening; to provide such a valve which, upon closing, will limit the flow of liquid with precision; to provide such a valve wherein the liquid remaining in the discharge tube will not drip or wet the outside of the discharge tube, and therefore will not drip onto containers, particularly those having small necks or the like, such as ampoules; to provide such a valve which will insure that liquid remaining in the valve outlet will not tend to drop from the outlet until the valve is again opened; to provide such a valve which is particularly adapted to be used in the filling of containers, such as bottles or ampoules, with liquid pharmaceuticals; to provide such a valve which may be operated manually or automatically; to provide such a valve which may be utilized for controlling the flow of liquids of different viscosity; to provide such a valve which may be used with liquids, such as pharmaceuticals, wherein cleanliness and sterility are essential; to provide such a valve which may be made in any one of a number of different forms; to provide such a valve which may be installed in different positions and for different purposes; and to provide such a valve which is capable of operating many times without getting out of adjustment or requiring repair.

Additional objects and the novel features of this invention will become apparent from the description which follows.

In general, a valve constructed in accordance with this invention includes a core or plunger having a conical or similar type of point, and an annular or other shaped seat which is resilient, and which will flex or give when the point of the plunger first enters the seat, but will react to move the plunger upwardly, even a very slight distance, thereafter. Preferably, the outlet of the valve is provided with a discharge tube of a size which, in accordance with the viscosity and adhesion characteristics of the liquid whose flow is being controlled, will cause the liquid to remain in the discharge tube which is present therein when the valve closes. Thus, when the valve first closes, and the resilient seat gives, the last portion of the liquid through the discharge tube will break off or drop away from the lower end of the discharge tube, and when the resilient seat springs back, the fluid remainder will be pulled back into the discharge tube. In this way, the flow of the liquid can be controlled accurately, normally without even a single drop more than is wanted being expelled from the discharge tube.

The valve core may be operated by hand, if desired, although it is normally preferable to utilize a high speed or quick acting device, such as an electromagnet, for operating the valve, particularly in opening. When an electromagnet is utilized, the valve core is made wholly or partially of magnetic material. A number of valves constructed in accordance with this invention are particularly adapted to be installed in a group or series, so that a number of containers may be filled simultaneously, the valves being controlled simultaneously.

The valve core, seat, and discharge tube, as well as the manner in which the valve is installed and/or operated, may be varied, as in the constructions illustrated in the accompanying drawings, in which.

Figures 1, 2, 3:
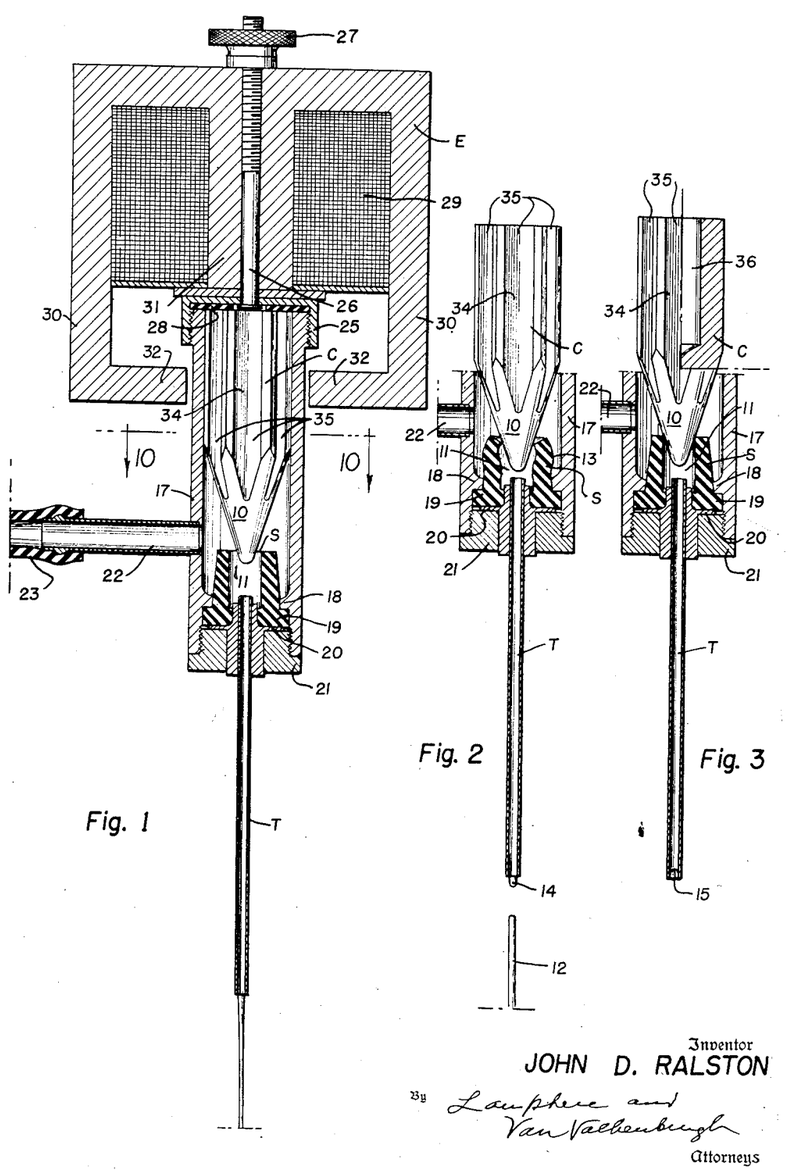
Fig. 1 is a vertical section taken through a valve constructed in accordance with this invention, the valve being opened electro-magnetically and shown in open position.
Fig. 2 is a similar vertical section of the valve of Fig. 1, with certain parts omitted, illustrating particularly the position of the valve core and its seat when the valve is first closed.
Fig. 3 is a vertical section similar to Fig. 2, but illustrating particularly the position of the valve core and its seat a short time thereafter.

As illustrated in Fig. 1, a valve constructed in accordance with this invention may comprise a core C having a conical point 10 at its lower end and adapted to open or close the passage 11 through a tubular seat S, which may be formed of live rubber or a suitable synthetic elastomer, the core C being moved to open position by an electro-magnet E and dropping by gravity to closed position. The outlet of the valve is provided with a discharge tube T which is preferably sufficiently small, dependent upon the viscosity and adhesion characteristics of the liquid being controlled, that when the core C is released by the electromagnet E and drops onto the valve seat S, the liquid in the tube T will tend to remain therein. An inside diameter of about $\frac{1}{16}$ inch to $\frac{1}{8}$ inch for a stainless steel tube, when the flow of a liquid having the viscosity and adhesion characteristics of water is controlled, has been found satisfactory, although a smaller diameter tube may be used for such a liquid, or a larger diameter tube when a greater rate of flow is desired. Also, a tube larger in inside diameter than one used for water may be used for a liquid having a higher viscosity and/or higher coefficient of adhesion than water, while it may be necessary to use a smaller tube for a liquid having a considerably lower viscosity and/or lower coefficient of adhesion than water, the coefficient of adhesion, of course, depending upon the material of the tube as well as the liquid. When the valve closes, as in Fig. 2, the resilient seat S will give or be pushed downwardly slightly, and the liquid in tube T will be pushed slightly outwardly from the lower end of the tube, where separation of the liquid stream takes place, the separated liquid 12 falling or being discharged, as into the container being filled. As in Fig. 3, the resilience of the seat S moves the core C slightly upwardly, shortly after closing, so that the liquid below the seat is pulled up into the tube T. In this manner, the discharge of an additional drop or drops, following the break in liquid flow, is avoided. As a result, the outside of tube T, at the lower end, it not wet and does not carry adhering drops of liquid.

The return of the core C, from the position of Fig. 2 to that of Fig. 3, is assisted by the construction and position of the seat S, which, being generally tubular in form, is vertically disposed and has an internal, generally cylindrical smooth bore and an outside frusto-conical shape to provide a decreasing wall thickness from bottom to top, the major length of which tube, from its top down, being surrounded by liquid, this factor not only assisting in a quick start of flow, but also in the precise termination of flow. Thus, when the core C drops on the seat S, as in Fig. 2, the side walls of the seat S tend to bulge outwardly, and the seat also tends to grip the point 10. Then the natural resiliency, combined with the liquid pressure against the bulge 13 of Fig. 2, restores the seat to the position of Fig. 3. When the liquid is predominantly water, or has equivalent viscosity and adhesion characteristics, the liquid stream on breaking has tended in tests to form a convex meniscus 14, as in Fig. 2, and when the core and seat are drawn back, has tended in tests to form a concave meniscus 15 at the lower end of tube T, as in Fig. 3, although other liquids may form different menisci. In any event, the flow may be terminated with precision, as the discharge of even one additional drop may be prevented, even though the valve is vibrated or subjected to impact or jar.

For filling operations, the discharge tube may extend into a bottle or ampoule to be filled, or a needle or the like provided on the lower end for penetrating a self-sealing top or cap to the ampoule or bottle. Also, the discharge tube T may be merely a portion of a longer discharge tube, preferably having either a larger diameter or a section of larger diameter at the end of the discharge tube T, so as to facilitate the breakage of the column of flowing liquid when the valve closes. The valve may also be utilized in vending machines or the like, wherein a measured amount of liquid, such as coffee, milk, etc., is dispensed at each actuation, and drip is undesirable, for sanitary reasons.

The core C and seat S may be installed within a suitable valve body, which may include a cylindrical barrel 17 provided adjacent its lower end with an annular, inwardly extending flange 18. The lower end of seat S is provided with an outwardly extending flange 19, the seat S extending upwardly above barrel flange 18, and seat flange 19 being clamped against barrel flange 18 for sealing purposes, by a flanged retaining ring 20, through which tube T extends and to which the tube is attached. Pressure against retaining ring 20 is provided by a lower cap 21, preferably threadedly engaging the lower end of barrel 17. At or slightly above the upper end of seat S, the barrel 17 may be provided with an opening in which a feed nipple 22 is attached to the barrel, to provide a direct flow to passage 11 in seat S, although other positions of feed nipple 22 are possible. The feed nipple 22 may be connected by a flexible tube 23 or a rigid pipe, if desired, with a source of the liquid whose flow is to be controlled. Such liquid may be stored in a container filled to a sufficient depth to produce a hydrostatic pressure within the valve, or other source providing sufficient pressure to produce the desired flow through the valve when the valve is opened.

The upper end of barrel 17 may be closed by an upper cap 25, which permits access to the valve, for removal of core C and cleaning or the like, and which may conveniently have attached thereto a rod 26 adapted to suspend the valve, rod 26 being provided with an adjusting nut 27, by which the vertical position of the entire valve may be adjusted. Upper cap 25 may also be provided with a gasket 28 which seals the upper end of barrel 17 and also acts as a stop for the upper end of core C. The valve core C is made of magnetic material, such as steel, preferably chrome plated or the like, or may be made of ferromagnetic stainless steel. The barrel 17 and other parts in the magnetic field are made of non-magnetic material, such as the more common stainless steels, aluminum, brass, or others. All parts on or through which the liquid flows or comes into contact are preferably made of stainless steel, or any desired metal plated with chromium, etc., or other suitable material resistant not only to the action of the liquid whose flow is being controlled, but also resistant to rust and readily maintained in sterile, sanitary condition.

The electromagnet E may include a winding 29 and pole pieces 30 formed of suitable material and including legs 31 which extend downwardly alongside rod 26 to the upper cap 25 with the winding 29 surrounding legs 31, and including also lower arms 32 which extend toward the barrel 17 below cap 25. As will be evident, the magnetic field produced by electromagnet E passes between legs 31 and arms 32, and thus includes at least the upper portion of core C. Since the core C is required to move only a short distance to open passage 11 in seat S, due to conical point 10, the tendency for core C to move further into the magnetic field results in a quick opening of the valve when current, preferably direct current, is supplied to winding 29. As indicated previously, the supply to and termination of current to electromagnet E may be controlled electronically or in any other suitable manner, which in any event readily results in almost instantaneous opening movement and release of the core. When a series of valves are utilized in filling a number of containers simultaneously, a single magnet having a winding surrounding all of the rods 26 and a pole piece extending to each upper cap and to the sides of each barrel 17 below the upper cap, or an individual magnet for each valve, may be utilized. In such case, the valves are placed in alignment, and operated simultaneously, the containers being passed beneath the valves on a special conveyor and stopped beneath the valves during the filling operation.

Figure 10:
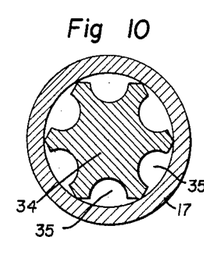
Fig. 10 is a horizontal cross section taken through a valve core and barrel, as along the line 10—10 of Fig. 1, illustrating particularly the configuration of the body of the core.
Figure 11:
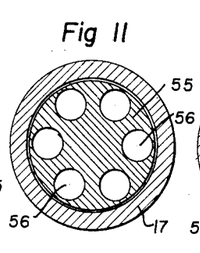
Figs. 11 to 13, inclusive, are similar cross sections, illustrating possible variations in the configuration of the core body.
Figure 12:
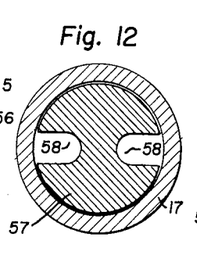
Figure 13:
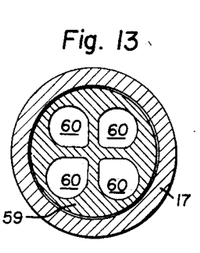

In addition to conical point 10, and as shown also in Fig. 10, the core C may include a body 34, of any suitable shape, such as hexagonal, adapted to slide within the barrel 17 and be maintained in exact alignment therein. The sides of the hexagonal body 34 of the core may be provided with grooves 35, such as arcuate in cross section and extending longitudinally to provide space for liquid displacement when the valve opens and closes. The conical point 10 of the core need not be sharp at the lower end, but may be slightly rounded off, as shown.

The weight of the core C is preferably proportioned to the amount of resistance offered by the fluid, particularly when dropping to closed position, and also the amount of force necessary to be supplied through electromagnet E for lifting the core. Thus, the upper end of the core may be drilled out, as by a cylindrical bore 36, shown in Fig. 3, to adjust the weight thereof, the size and depth of the bore 36 being in accordance with the final weight of core desired.

Figure 4:
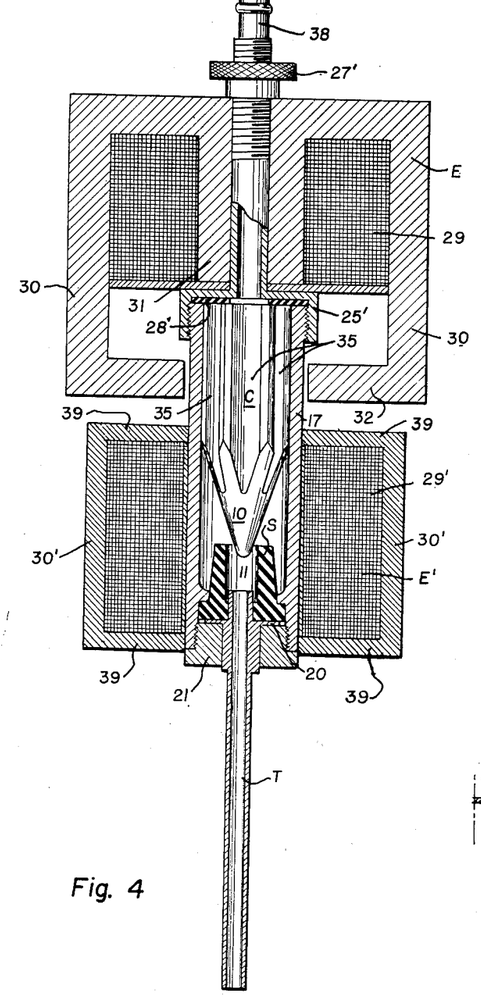
Fig. 4 is a vertical section taken through a slightly different valve constructed in accordance with this invention, in which the valve is both opened and closed electro-magnetically.

The valve of this invention may be installed and controlled in different manners. For instance, as illustrated in Fig. 4, an electromagnet E may be utilized in opening the valve, and an electromagnet E' for closing the valve, such construction being particularly advantageous when a relatively highly viscous liquid is being controlled, which would tend to unduly retard the downward or closing movement of the core. Also, instead of entering at the side of the valve, as in Fig. 1, a feed nipple 38 may extend upwardly from upper cap 25', the feed nipple 38 also being adapted to be utilized to support and adjust the vertical position of the valve, as through an adjusting nut 27'. In addition, the gasket 28' may have a circular hole in the center, so that the liquid passing through feed nipple 38 will readily flow through grooves 35 to the seat S. In the valve of Fig. 4, the barrel 17, seat S, retaining ring 20, lower cap 21 and discharge tube T may be similar to the same parts described in connection with Fig. 1. The opening electromagnet E of Fig. 4, having a winding 29 and pole pieces 30 provided with legs 31 and lower arms 32, is also similar to the electromagnet E of Fig. 1. The electromagnet E' of Fig. 4 may be provided with a winding 29' and pole pieces 30' having top and bottom arms 39 extending to barrel 17 and adapted, when the winding 29' is energized, to produce lines of magnetic flux passing between arms 39 which pass through the lower portion of core C, thus tending to cause the core to move downwardly farther into the magnetic field.

Figure 5:
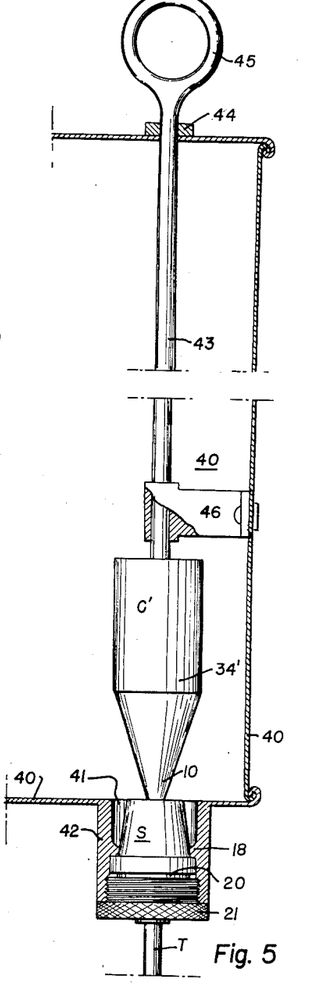
Fig. 5 is a vertical section taken through a portion of a liquid receptacle in which is installed a valve also constructed in accordance with this invention, the valve being adapted to be opened manually, or by mechanical linkage or other means.

The valve of this invention may also be installed within a receptacle, and operated by hand or by a linkage mechanism, as in the construction illustrated in Fig. 5. Such construction is, of course, adapted to be utilized primarily in cases in which the flow is to be completely shut off at a predetermined time, but the filling operation is not expected to proceed as rapidly as when a series of small bottles or ampoules are being filled. The valve of Fig. 5 may be installed in a receptacle 40 having an outlet opening 41 in the bottom, a partial valve barrel 42 being mounted within or below the opening 41 and attached to the bottom of receptacle 40. As shown, the partial barrel 42 may be provided with an inwardly extending flange 18, and thereby be similar to the lower portion of the barrel 17 of the valve of Fig. 1, while the seat S, retaining ring 20, lower cap 21 and discharge tube T may be substantially the same as described in connection with Fig. 1. The valve core C' of Fig. 5 has a conical point 10 and a core body 34' which may be round, or any other desired shape. Since the liquid in receptacle 40 has relatively free access to the valve seat S, as will be evident, grooves or other side configurations of the core body 34' are normally unnecessary. Core C' is adapted to be pulled upwardly by a rod 43 attached to the upper end of the core and extending upwardly through a sealing collar 44 at the top of the receptacle 40. The rod 43 is conveniently provided with a ring 45 at its upper end, for opening the valve. the valve being guided by sealing collar 44 and a bearing bracket 46 attached to the side of receptacle 40 in spaced position above the core C'.

Figure 6:
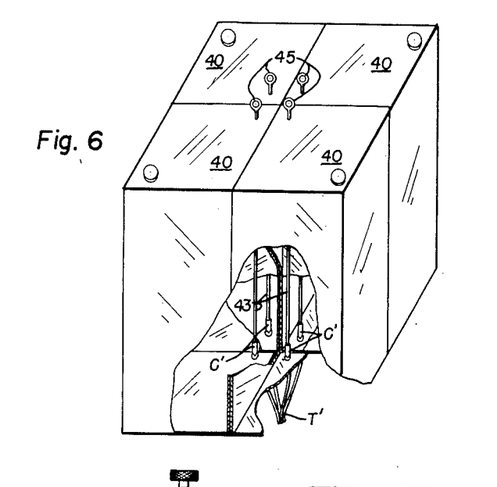
Fig. 6 is a three-dimensional view of a plurality of receptacles, adapted to contain either the same or different types of liquid, each being provided with a valve constructed in the manner shown in Fig. 5 and the discharge from the valves being led to a common outlet.

As in Fig. 6, a number of receptacles 40 may be grouped together, and adapted to contain different types of liquid, each being provided with a valve similar to that of Fig. 5, mounted in the adjacent corners of the receptacles. The rings 45, for opening and closing the valves, thus may be located in conveniently close positions, and are adapted to be operated either by hand or by a linkage mechanism or levers connected therewith. The outlet tubes T', leading from each of the valves of Fig. 6, may be brought together at their lower ends, so that the liquid discharged from each of the receptacles 40 may be fed into a common container. It will be understood, of course, that the different types of liquids may be supplied to chemical reaction apparatus, particularly wherein a batch operation is to be carried out. A plurality of valves and receptacles may also be utilized in vending machines and the like, for instance, wherein measured but different amounts of liquids, such as coffee and cream, are dispensed simultaneously.

Figures 7, 8:
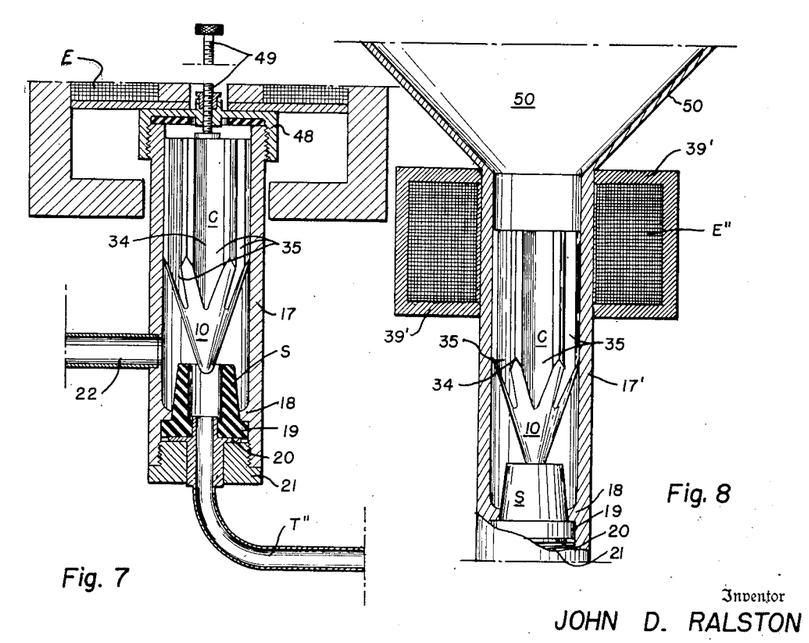
Fig. 7 is a limited vertical section through a valve similar to that of Fig. 1, but provided with a curved discharge tube and an adjustment for limiting the opening movement of the valve.
Fig. 8 is a vertical section taken through another valve similar to that of Fig. 2, but installed beneath a lower discharge spout of a receptacle.

As in Fig. 7, the discharge tube may be curved instead of straight, such as the tube T'', the lower portion of which extends horizontally from the upper portion. The core C, seat S, barrel 17, feed nipple 22, retaining ring 20 and lower cap 21 are constructed as previously described. However, the upper cap 48 may be provided with a stop screw 49, which is adjustable and limits the upward movement of the core C, so as to regulate the amount of liquid flowing through the valve in a predetermined period of time, thus providing a flow adjustment in addition to that procured by changing the time. A series of valves constructed as in Fig. 7 may be utilized in controlling the flow of different amounts of liquid to different containers, as by proper adjustment of the respective stop screws 49, particularly when a single timing device is utilized.

A valve of this invention may be installed, as in Fig. 8, beneath an outlet spout 50 of a receptacle, the upper end of the barrel 17' thereof being attached to spout 50, and the seat S, valve core C and associated parts being similar to those of Fig. 1. An electromagnet E'' similar to the lower electromagnet E' of Fig. 4 is preferably utilized, inasmuch as the spout 50 and barrel 17' do not permit upper legs, such as upper legs 31 of the electromagnet E, to be utilized, but only upper and lower arms 39'.

Figure 9:
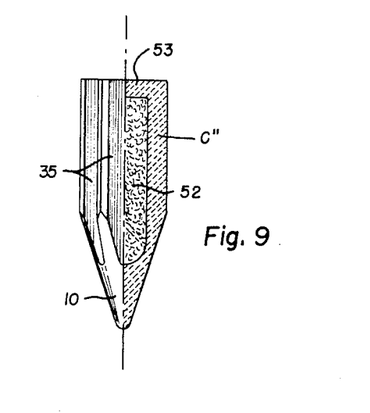
Fig. 9 is a side elevation, partly in section, of a valve core having a shell made of glass or other non-magnetic material, but filled with iron filings or similar magnetic material.

The valve core may be made of different materials, such as the valve core C'' of Fig. 9, which is hollow and made of glass or other material which is easily cleaned and maintained in sanitary condition. Since glass is non-magnetic, the core C'' is filled with iron filings 52, or other suitable magnetic material, the upper end being closed by a cap 53, which may be fused to the body of the core by flame, or in any other suitable manner.

Other and different variations may also be made in the valve core, such as shown in Figs. 11 to 17, inclusive. As in Fig. 11, a cylindrical core body 55 may be provided with a plurality of longitudinally extending holes 56, the core body being cylindrical and sufficiently large so that it is guided accurately by the barrel 17. As in Fig. 12, the core body 57 may again be cylindrical but provided with a pair of relatively large slots or grooves 58, disposed diametrically opposite each other, or in any other suitable position. As in Fig. 13, the core body 59 may again be cylindrical, but provided with a series of irregularly shaped holes 60 which occupy a substantial portion of the cross sectional area of the core body, and which may be wider at the outside and narrower toward the inside, in accordance with the sector in which each hole is disposed, such sectors being quadrants when the holes are four in number. The provision of holes extending inwardly to or almost to the center of the core body also may be utilized in the valve construction of Fig. 4, wherein the inlet to the valve is at the top, rather than at the side. The valve core of Fig. 1 may be modified as in Fig. 14, wherein the upper central portion of the core body is cut away to form a central stem 61, which thereby produces a cylindrical groove extending transversely, such groove reducing the weight of the core body and providing a larger space for liquid displacement. The core of Fig. 14 may also be utilized in connection with an adjustable stop screw at the top for limiting the upward movement of the core, such as in the manner shown in Fig. 8.

Figures 14, 15:
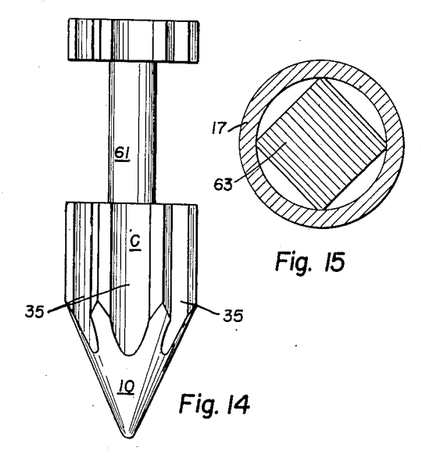
Fig. 14 is a side elevation of a valve core similar to that of Fig. 1, but cut away at the center.
Fig. 15 is a cross section similar to Fig. 10, but showing a square or diamond shaped core body.
Figures 16, 17:
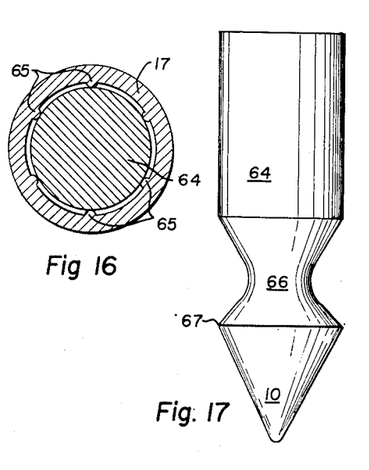
Fig. 16 is a cross section similar to Fig. 10, but illustrating a core having a body which is circular in cross section, and a barrel which is provided with alignment and flow passage producing ribs.
Fig. 17 is a side elevation of a possible construction of the core of Fig. 16.

The core body may also have other shapes, such as the square or diamond shaped core body 63 of Fig. 15, or the cylindrical core body 64 of Fig. 16. In the latter instance, the core may be guided by a circumferentially spaced series of ribs or projections 65, provided on the inside of the barrel 17. Also, to provide additional space for fluid displacement, particularly adjacent the valve seat, the core body 64 of Fig. 16 may be formed as shown in Fig. 17, having a neck 66 formed above the conical point 10. An edge 67 between point 10 and neck 66 may be rounded, or may be relatively sharp, as shown, so as to assist in agitation of liquid in the space around seat S, to prevent liquid from settling and staying in such space. As will be evident, the core C may be provided with downwardly extending fingers, either straight or spiral, adapted to agitate such liquid, agitation being more desirable, perhaps, when the liquid carries a finely divided solid in suspension or other material which may tend to settle out in such space. While various possible modifications of the shape and configuration of the core body are described above, it will be understood that additional shapes and configurations are possible, and also that the barrel 17 may have other configurations.

Figures 18, 19, 20, 21:
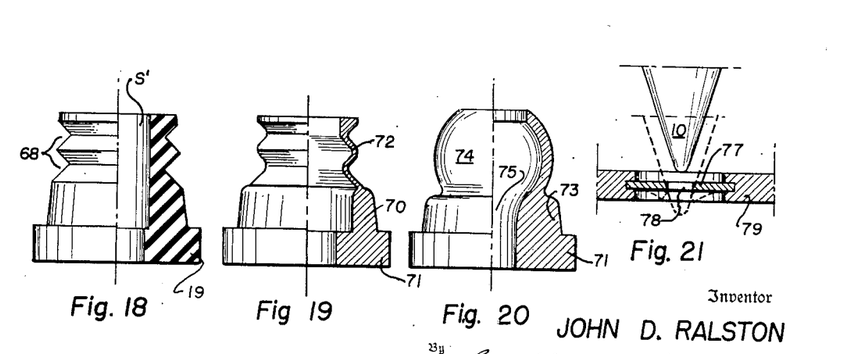
Fig. 18 is a side elevation, partly in section, of a modified form of valve seat, conveniently made of rubber elastomer.
Figs. 19 and 20 are side elevations, partly in section, of alternative constructions of valve seats which may be made of metal.
Fig. 21 is a fragmentary vertical section through a valve seat comprising a metal diaphragm, showing also the lower end of the valve core.

The seat S may vary in size, in accordance with the size of the core, and also may vary in cross sectional shape, as well as the material of which it is made. For instance, a generally cylindrical seat made of live rubber or elastomer may be constructed as in Fig. 18, in which grooves 68 are cut in the outer wall of the upstanding portion of the seat S', or a corrugated effect produced in any other desired manner, to provide additional resilience, and also to permit the pressure of the liquid to produce a greater reaction in returning the seat to its normal position, after being pushed downwardly and flexed by the impact of the core, upon closing the valve. The seat may also be made of metal, such as in the forms illustrated in Figs. 19 to 21. As in Fig. 19, a relatively solid, generally cylindrical base 70, having a flange 71 for clamping against a gasket, or otherwise being sealed, may support an annular, corrugated-like ring 72, thickened at the top, if desired, to withstand wear. As will be evident, the ring 72 is adapted to be pressed downwardly by the core as the valve closes, but tends to spring back into normal position, the pressure of liquid on the outside of the corrugations of ring 72 also assisting in causing the ring to spring back. In the construction of Fig. 20, the base 73 is slightly heavier than the base 70 of Fig. 19, although the base may be provided with a similar clamping flange 71. A ring 74 is mounted on top of base 73, the ring 74 having inner and outer surfaces corresponding to a spherical segment, the wall of the ring 74 thus bulging outward, as shown, to increase the resiliency, and also the area against which liquid pressure may act in assisting to bring the ring back to normal shape, after impact by the core as the valve is closed. The passage 75 through the seat of Fig. 20 may be streamlined, as it were, to eliminate sharp angles along the path of the liquid, the base 73 being relatively thick to provide such a passage.

Particularly when the pressure of liquid is relatively low, i. e. when the liquid pressure would be a relatively minor factor in bringing the valve seat back after impact by the core, a seat construction such as illustrated in Fig. 21 may be utilized. Such construction may include a relatively resilient or flexible, flat annular diaphragm 77, into the center hole 78 of which the core point 10 extends on closing. The diaphragm 77 may be mounted in a relatively solid ring 79, so that when the core point 10 engages the diaphragm 77, the diaphragm will bend, as to the dotted position of Fig. 21, but will then spring back, perhaps not quite to the full position of Fig. 21, but a sufficient distance to cause the liquid being controlled to be drawn back up into the discharge tube. As will be evident, each of the seats of Figs. 18 to 20, inclusive, is also adapted to spring back or move upwardly, after the initial closing, so as to draw the liquid back up into the discharge tube.

From the foregoing, it will be evident that the valve of this invention fulfills to a marked degree the requirements and objects hereinbefore set forth. The provision of a valve core, or other means for closing an opening in a valve seat, with a resilient valve seat which tends to spring back or move the valve core or closing means upwardly, after the initial impact on closing movement of the core, insures that the flow will normally be stopped at the time that the valve core closes, but also that a reversible flow, sometimes only slight, will tend to take place immediately thereafter. This tends to cause an almost instantaneous cessation of the flow of liquid being controlled, so that the valve is particularly adapted to be utilized in measuring with a high degree of accuracy. The combination of such a core or closing means and a resilient seat, with a restricted discharge tube, has resulted in a high degree of accuracy. When the restricted discharge tube is sufficiently small in diameter, after breakage of the column of flowing liquid, the liquid in the discharge tubes tends to remain there.

As will be evident, the valve of this invention is susceptible of many variations, not only in its size and in the materials of which it may be made, but in the manner of actuation and the point of connection of the feed or inlet thereto. Also, as shown in Figs. 5 and 6, the valve may be installed within a receptacle, without a barrel enclosing the valve core. The material of which the valve is made may be varied considerably, although for handling pharmaceuticals, glass, nickel plated steel, or other metallic or non-metallic material which is readily cleaned and does not tend to tarnish or react with the liquid whose flow is being controlled, is preferred wherever possible. As will be evident, relatively wide variation may be made in the shape and configuration of both the valve core and of the valve seat, as long as the valve tends to close the seat effectively and the seat tends to spring back or return the valve a suitable distance after initial closing movement.

With these features, it is also essential that the core nose be conically tapered, that is coned, through the zone of its contact with the valve seat, and by reference to that core as being conical, it is meant that the core is coned in that zone irrespective of the shape of the remainder of the nose adjacent that zone, the zone area of the core being the operative part of the core in respect to opening and closing of the valve.

Also it is essential that there be a resilient walled chamber, from the under side of which fluid may discharge through an opening so proportioned that the chamber will be maintained fluid filled during the fluid flow, and into which chamber the core nose may enter but not fill it, so that when the nose is dropped into the opening at the top of the chamber, there will be effected a sudden sealing off between the nose and the upper rim of the resilient chamber, and the wall of the chamber will be distorted outwardly and downwardly somewhat as indicated in Fig. 2, momentarily decreasing the volume of the chamber. The fluid prior to the sealing off will have been flowing through the chamber in a column. After sealing off, the column is still traveling with a certain velocity, but on that sudden sealing off, the chamber wall will momentarily collapse downwardly and outwardly and then inwardly, tending to return to its normal state finally when the column is broken off to leave a residual portion of the column having its upper end extending into the chamber, this residual length of the column being tended to be pulled back into the chamber by the substantial return of the chamber wall to its original state as viewed in Fig. 3. That is, when the chamber is suddenly sealed off by the valve core, there is tended to be formed very suddenly the upper end of a Torricellian tube, this upper end portion of the tube being flexible as embodied in the seat S. The velocity of the downward traveling column of fluid tends to cause this upper portion of the tube to collapse to some degree, and under atmospheric pressure, the residual portion of the column is braked to a stop, and then the natural resilience or elasticity of this upper end portion of the tube in returning to its normal state tends to lift the valve core and also expand the chamber until the chamber wall has returned to substantially its normal, initial condition. In so doing, this upper residual portion of the column is lifted by atmospheric pressure to hang in balance from a vacuum within that upper flexible chamber, against the supporting atmospheric pressure. Thus the residual column is actually lifted to have its lower end drawn back from the discharge orifice. The result is that the residual column is withdrawn back from the orifice and therefore does not have a "bleeding" effect to produce an after drop. This is due entirely to the inherent Torricellian tube effect.

While various forms of both the valve core and the valve seat have been illustrated and described, it will be understood that such forms are representative only, and that various other forms may exist. Also, it will be understood that the valve may be used in controlling various types of liquids, and additional changes may be made, all without departing from the spirit and scope of this invention.

What is claimed is:

1. In a liquid control valve, a core; a resilient seat having a passage therethrough and which is engaged by said core when said valve is closed, said seat being adapted to give on initial closing and then spring back to move said core in the opposite direction; and a discharge tube leading from said seat and having a length and cross sectional area in proportion to the viscosity and adhesion characteristics of the liquid whose flow is being controlled, such that the liquid in said discharge tube upon the closing of said valve tends to be sucked back in said tube when said seat springs back and thereby tends to remain in said discharge tube.

2. In a liquid control valve, a body having an outlet; a core for controlling the flow of liquid through said outlet and having a conical point at the lower end thereof; a generally cylindrical resilient seat, the end of which is engaged by said conical point when said valve is closed, said seat being adapted to give on initial closing and then spring back to move said core in the opposite direction, said outlet having a length and cross sectional area in proportion to the viscosity and adhesion characteristics of the liquid whose flow is being controlled, such that the liquid in said outlet upon the closing of said valve tends to be sucked back in said outlet when said seat springs back and thereby tends to remain in said outlet.

3. In a liquid control valve, a conical nosed valve core; and a resilient seat having a passage therethrough and which passage is entered by said core to close said valve; said seat comprising a resilient chamber, and being characterized by giving with the movement of the core upon initial closure and then springing back to reverse the movement of the core; said chamber passage defining a resilient walled tube having a length and a cross-sectional outlet area in proportion to the viscosity and adhesion characteristics of the liquid whose flow is being controlled such that the liquid at said outlet area, upon said valve closing, tends to be lifted from said area under the effect of said core reverse movement.

4. In a liquid control valve, a conical nosed valve core; and a resilient seat having a passage therethrough and which passage is entered by said core to close said valve; said seat comprising a resilient chamber, and being characterized by giving with the movement of the core upon initial closure and then springing back to reverse the movement of the core; said chamber passage defining a resilient walled tube having a length and a cross-sectional outlet area in proportion to the viscosity and adhesion characteristics of the liquid whose flow is being controlled such that the liquid at said outlet area, upon said valve closing, tends to be lifted from said area under the effect of said core reverse movement; said outlet area further being characterized by being such that during flow of the fluid through said chamber, the chamber is maintained substantially fluid filled.

5. A precision fluid flow control valve comprising a chamber, the upper portion at least of which is elastic walled and having spaced apart upper and lower orifices; a free valve member of a specific gravity greater than that of the fluid being controlled and having a depending conical nose of a size to enter by a length thereof into said upper orifice and be elastically and sealingly gripped around its side by the margin of said upper orifice; the height of said chamber and the diameter of said lower orifice having that relation which will set up in said chamber for the range of density and viscosity of the fluid to be handled, a flexible length of a top closed end of a Torricellian tube to support a column of the fluid above said lower orifice when said upper orifice is sealed; and means for vertically lifting and dropping said valve member to open and close said upper orifice.

6. A precision fluid flow control valve comprising a chamber, the upper portion at least of which is elastic walled and having spaced apart upper and lower orifices; a free valve member of a specific gravity greater than that of the fluid being controlled and having a depending conical nose of a size to enter by a length thereof into said upper orifice and be elastically and sealingly gripped around its side by the margin of said upper orifice; the height of said chamber and the diameter of said lower orifice having that relation which will set up in said chamber for the range of density and viscosity of the fluid to be handled, a flexible length of a top closed end of a Torricellian tube to support a column of the fluid above said lower orifice when said upper orifice is sealed; and means for vertically lifting and dropping said valve member to open and close said upper orifice; and means for conducting fluid to said upper orifice and retaining the fluid around, externally of said chamber.

7. A precision fluid flow control valve comprising a chamber, the upper portion at least of which is elastic walled and having spaced apart upper and lower orifices; a free valve member of a specific gravity greater than that of the fluid being controlled and having a depending conical nose of a size to enter by a length thereof into said upper orifice and be elastically and sealingly gripped around its side by the margin of said upper orifice; the height of said chamber and the diameter of said lower orifice having that relation which will set up in said chamber for the range of density and viscosity of the fluid to be handled, a flexible length of a top closed end of a Torricellian tube to support a column of the fluid above said lower orifice when said upper orifice is sealed; and means for vertically lifting and dropping said valve member to open and close said upper orifice; said chamber being of a tubular nature free to tend to collapse inwardly toward said nose length and therebelow to said lower orifice; said chamber wall having an increasing thickness ranging from said upper orifice toward said lower orifice, setting up an increasing resistance to said collapsing.

8. A precision fluid flow control valve comprising a chamber, the upper portion at least of which is elastic walled and having spaced apart upper and lower orifices; a free valve member of a specific gravity greater than that of the fluid being controlled and having a depending conical nose of a size to enter by a length thereof into said upper orifice and be elastically and sealingly gripped around its side by the margin of said upper orifice; the height of said chamber and the diameter of said lower orifice having that relation which will set up in said chamber for the range of density and viscosity of the fluid to be handled, a flexible length of a top closed end of a Torricellian tube to support a column of the fluid above said lower orifice when said upper orifice is sealed; and means for vertically lifting and dropping said valve member to open and close said upper orifice; the wall of said chamber being characterized as to elasticity to resist complete collapsing but permitting deformation from a normal shape under the combined effect of impact and weight of said valve member seating in said upper orifice plus external pressure therearound induced by flow of the liquid from the chamber through said lower orifice, after said sealing of the upper orifice, and being further characterized by ability to overcome in part at least that deformation by atmospheric pressure operating to lift said fluid column toward said chamber to permit the chamber wall to spring back toward its normal shape.

9. A liquid control valve comprising a vertically disposed cylindrical barrel formed of non-magnetic material; a valve core formed at least in part of magnetic material and constructed for guided upward and downward movement in said barrel, said valve core having a conical point at the lower end and a hexagonally shaped body provided with arcuate, longitudinally extending grooves in the sides thereof; a generally cylindrical valve seat formed of resilient material and having an outwardly extending flange at the lower end thereof, said barrel having an inwardly extending flange adjacent the lower end and said valve seat extending through and above said flange so that the outer surface of the upper portion of said valve seat is subjected to fluid pressure in said barrel; a feed nipple connecting with the interior of said barrel adjacent the upper end of said valve seat; a discharge tube leading from said valve seat and having a diameter sufficiently small in relation to the viscosity and adhesion characteristics of the liquid whose flow is being controlled to tend to cause the liquid in said discharge tube upon closing of said valve to remain in said discharge tube; a valve seat clamping ring holding said seat flange against said barrel flange, said discharge tube depending from said clamping ring; a lower cap attached to said barrel for producing clamping pressure against the underside of said clamping ring; an upper cap attached to the upper end of said barrel and having a sealing gasket adapted to act also as a bumper for said core upon upward movement thereof; a supporting and adjusting rod attached to and extending upwardly from said upper cap; an electromagnet winding surrounding said supporting rod; and a pole piece for said winding having lower arms extending to the outside of said barrel at a point spaced below the upper end thereof, and inner legs extending downwardly along said rod to said upper cap, said winding surrounding said inner legs of said pole piece.

JOHN D. RALSTON.

REFERENCES CITED

The following references are of record in the file of this patent:

UNITED STATES PATENTS

| Number | Name | Date |
| --- | --- | --- |
| 1,100,219 | Butters | June 16, 1914 |
| 1,427,680 | English | Aug. 29, 1922 |
| 1,804,462 | Eggleston | May 12, 1931 |
| 2,150,760 | Cozzoli | Mar. 14, 1939 |
| 2,328,805 | Holthouse | Sept. 7, 1943 |